US 8,286,480 B2

(12) United States Patent
Holmes-Higgin et al.

(10) Patent No.: US 8,286,480 B2
(45) Date of Patent: Oct. 16, 2012

(54) POSITIVE DISPLACEMENT FLUID FLOW METER

(75) Inventors: Ian Holmes-Higgin, Berkhamsted (GB); Ian Young, Luton (GB); Ivor Rogers, Hitchin (GB)

(73) Assignee: Elster Metering Limited, Luton (GB)

( * ) Notice: Subject to any disclaimer, the term of this patent is extended or adjusted under 35 U.S.C. 154(b) by 516 days.

(21) Appl. No.: 11/990,169

(22) PCT Filed: Aug. 10, 2006

(86) PCT No.: PCT/GB2006/003013
§ 371 (c)(1),
(2), (4) Date: Aug. 16, 2010

(87) PCT Pub. No.: WO2007/017696
PCT Pub. Date: Feb. 15, 2007

(65) Prior Publication Data
US 2010/0300199 A1    Dec. 2, 2010

(30) Foreign Application Priority Data
Aug. 10, 2005    (GB) .................................. 0516466.0

(51) Int. Cl.
*G01F 3/08* (2006.01)
(52) U.S. Cl. ........................................................ 73/253
(58) Field of Classification Search .................. 73/273, 73/224, 335
See application file for complete search history.

(56) References Cited

U.S. PATENT DOCUMENTS

| 2,016,347 | A | | 10/1935 | Smith, Jr. |
| 3,432,108 | A | * | 3/1969 | Enright .................... 241/46.016 |
| 5,495,756 | A | | 3/1996 | Robitaille et al. |
| 5,576,489 | A | * | 11/1996 | Munck et al. ................... 73/257 |
| 6,688,866 | B2 | * | 2/2004 | Lambert et al. ............... 418/171 |
| 6,871,539 | B2 | | 3/2005 | Droin et al. |
| 6,925,867 | B2 | | 8/2005 | Mercier et al. |
| 2005/0188762 | A1 | | 9/2005 | Droin et al. |

FOREIGN PATENT DOCUMENTS

| DE | 24 48 124 A1 | 4/1976 |
| WO | WO-93/22631 | 11/1993 |

OTHER PUBLICATIONS

Translation of Office Action for Colombian Patent Application No. 08024082 dated Dec. 15, 2011.

* cited by examiner

*Primary Examiner* — Jewel V Thompson
(74) *Attorney, Agent, or Firm* — Harness, Dickey & Pierce, P.L.C.

(57) ABSTRACT

A positive displacement fluid flow meter comprises a chamber having a fluid inlet and a fluid outlet. A rotor is displaceable within the chamber, rotation of the rotor being related to the volume of fluid passing through the chamber. The chamber has a surface proximate which an end surface of the rotor passes, the chamber surface and/or the rotor end surface having at least one recess to retain at least a portion of debris carried by the metered fluid. The recess is preferably formed so as not to provide fluid, communication, from the inlet to the outlet across the rotor end surface. A lid closes an end of the chamber which in use is subject to the pressure of fluid within the chamber. The lid is engaged at its periphery to a wall of the chamber, and is preferably flexible adjacent its periphery to reduce the transmission of bending stresses between the periphery of the lid and the remainder thereof.

14 Claims, 5 Drawing Sheets

POSITIVE DISPLACEMENT FLUID FLOW METER

CROSS-REFERENCE TO RELATED APPLICATIONS

This application is a 371 US National Stage of International Application No. PCT/GB2006/003013, filed Aug. 10, 2006. This application claims the benefit of GB Application 0516466.0, filed Aug. 10, 2005.

This invention relates to fluid flow meters and is particularly applicable to fluid flow meters which measure positive displacement of fluid therethrough.

Positive displacement flow meters are well known in the art, measuring fluid displacement through a chamber with a rotary piston, where the rotation of the piston is related to the volume of fluid passing through the chamber. Such meters typically use counters operatively coupled to the piston for taking visually inspected meter readings. The counters usually comprise a series of gearedly connected wheels having indicia on respective external faces to indicate the volume of fluid which has passed through the flow meter.

A common problem associated with positive displacement flow meters is build up within the chamber over time of debris from the fluid being metered. Such debris may impede the movement of the piston, particularly when the debris is at an edge of the piston, and may affect the accuracy of the meter's measurements, by abrading closely fitting surfaces between the piston and chamber which thus allows fluid to leak past them. As an example, this is of concern where such flow meters are used by water authorities to measure the amount of water being used by, for example, a household. As debris builds up over time, the meter may not accurately reflect the volume of water being used by the household, and thus the water authority will end up undercharging the household for their water use. Where many meters are adversely affected in a given region, the water authority may thus suffer a significant loss of revenue.

Other related problems of the prior art affecting accuracy in meter readings include transmission of bending stresses between the lid and chamber both when the lid and chamber are clamped together, and when the meter is subjected to fluid pressure from the metered fluid flowing therethrough. Such bending stresses may cause bowing of the lid such that leakage occurs between the piston and the chamber's lid.

It is an object of at least one of the preferred embodiments of the invention to overcome or ameliorate at least one of the deficiencies of the prior art, or at least to provide a suitable alternative thereto.

According to a first aspect of the invention there is provided a fluid flow meter comprising: a chamber having a fluid inlet and a fluid outlet; and a rotor displaceable within the chamber, rotation of the rotor being related to the volume of fluid passing through the chamber, wherein the chamber has a surface proximate which an end surface of the rotor passes, the chamber surface and/or the rotor end surface having at least one recess to retain at least a portion of debris carried by the metered fluid.

Debris retained in the recess is less likely to interfere with the rotation of the rotor, and therefore is less likely to affect measurements of fluid volumes passing through the meter. Furthermore, abrasion between the rotor and the chamber due to trapped debris is reduced, thus reducing leakage. This can have the effect of increasing the working life of the meter, as it is more tolerant of accurate operation in the presence of trapped debris than the meters of the prior art.

Preferably the at least one recess is in a bottom said surface of the chamber.

Preferably the recess is formed so as not to provide fluid communication from the inlet to the outlet of the chamber across the rotor end surface via the recess. Alternatively, the at least one recess has a width in one direction which is less than a cross sectional width of the sidewall of the rotor.

Preferably the at least one recess is rounded, or cylindrical, or elongate. Alternatively the at least one recess is annular and coaxial with an axis of the chamber.

Preferably the fluid flow meter comprises a plurality of said recesses.

Preferably the plurality of recesses are adjacent a sidewall of the chamber.

Preferably the rotor is a rotary piston.

Preferably the fluid flow meter comprises a chamber having a fluid inlet and a fluid outlet; a rotor displaceable within the chamber, the rotation of the rotor being related to the volume of fluid passing through the chamber; and a lid closing an end of the chamber which in use is subject to the pressure of fluid within the chamber, the lid being engaged at its periphery to a wall of the chamber and being flexible adjacent its periphery to reduce the transmission of bending stresses between the periphery of the lid and the remainder thereof.

According to another aspect of the invention there is provided a fluid flow meter comprising: a chamber having a fluid inlet and a fluid outlet; a rotor displaceable within the chamber, the rotation of the rotor being related to the volume of fluid passing through the chamber; and a lid closing an end of the chamber which in use is subject to the pressure of fluid within the chamber, the lid being engaged at its periphery to a wall of the chamber, the lid being flexible adjacent its periphery to reduce the transmission of bending stresses between the periphery of the lid and the remainder thereof.

Advantageously, the configuration of the lid reduces the potential leakage between the rotor and a sidewall of a chamber and also reduces potential pinching of the rotor by the chamber sidewall, therefore allowing for more accurate metering of the fluid flowing therethrough.

Preferably the lid comprises an annular flex portion adjacent its periphery permitting said flexibility.

Preferably the flex portion comprises a clamping portion for said engagement of the lid to the chamber, and an annular groove permitting said flexibility.

Preferably the lid comprises a flat circular portion and a cylindrical sidewall depending from a periphery thereof, the flex portion being on the flat portion and allowing a central part of the flat portion bound by the flex portion to move with respect to an outer part of the flat portion outside of the flex portion.

Preferred embodiments of the invention will now be described, by way of example only and where like reference numerals denote like parts, with reference to the accompanying drawings in which.

Referring to FIGS. 1 to 4 and 7, a preferred embodiment of the present invention comprises a volumetric water meter 10 having a cylindrical chamber 12 and a cylindrical piston 13 which is mounted for eccentric movement within the chamber 12. Successive stages in the path of this eccentric movement of the piston are illustrated in respective FIGS. 1 to 4. The basic features and operation of such water meters are known in the art, for example in our U.S. Pat. No. 5,567,876, however a brief description is provided below to aid in the understanding of the present invention.

Figure 1:
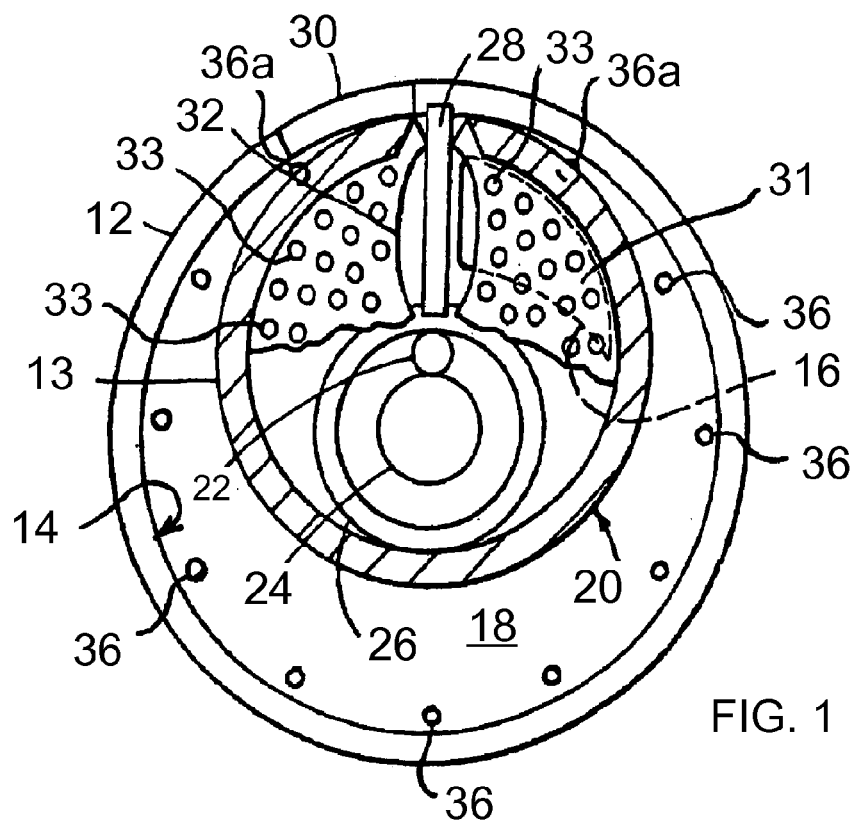
FIGS. 1 to 4 are diagrammatic plan views of a chamber of a flow meter according to the present invention with lid removed, illustrating a piston in several positions during a metering cycle.

Turning initially to FIG. 1, the cylindrical chamber 12 has a cylindrical sidewall 14. A half-crescent shaped inlet port 16 is provided in a base 18 of the chamber 12 and is open to the interior of the piston 13. This piston has a cylindrical sidewall 20 and an axial pin 22 which runs in an annular track formed in the base 18 of the chamber between co-axial boss 24 and collar 26. A fixed dividing plate or shutter 28 extends radially between the collar 26 and the chamber sidewall 14, adjacent the inlet port 16. An outlet port 30 is provided in the chamber sidewall 14 to the opposite side of the dividing shutter 28. The piston 13 preferably has a holed plate 31 with a slot 32 formed therein, the slot 32 also being formed in the piston sidewall 20, enabling the piston to slide radially of the shutter 28 in its circumferential movement. The holed plate 31 is positioned half way up the piston sidewall 20, perpendicular to the piston's axis. It prevents or reduces distortion of the piston sidewall 20 during operation. Holes 33 in the plate 31 allow fluid communication between upper and lower interior piston volumes defined by the plate 31 and the piston sidewall 20.

Figure 2:
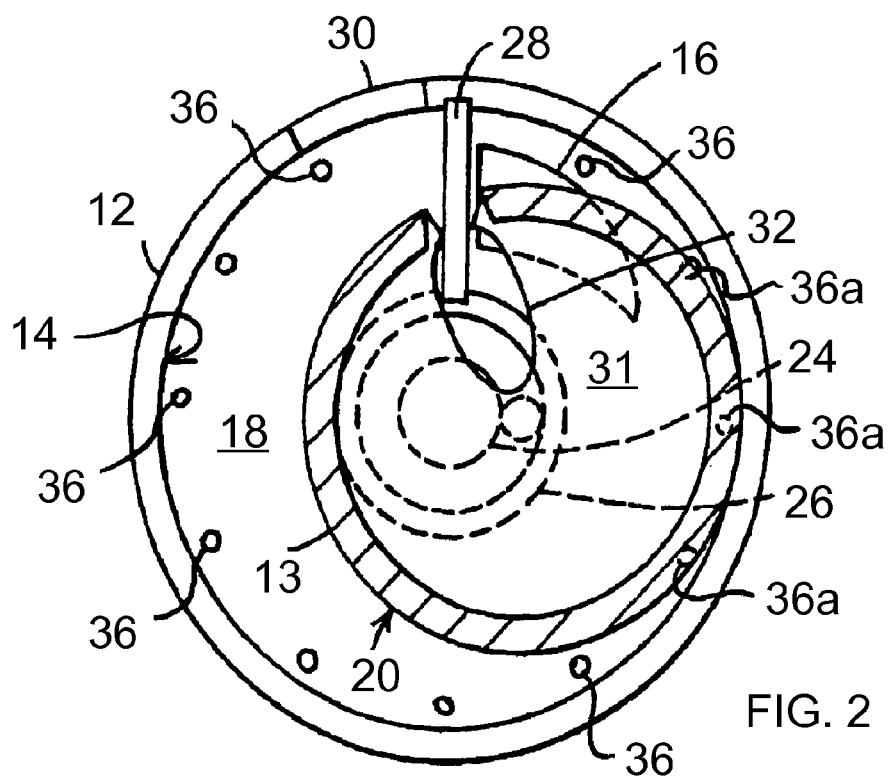
Figure 3:
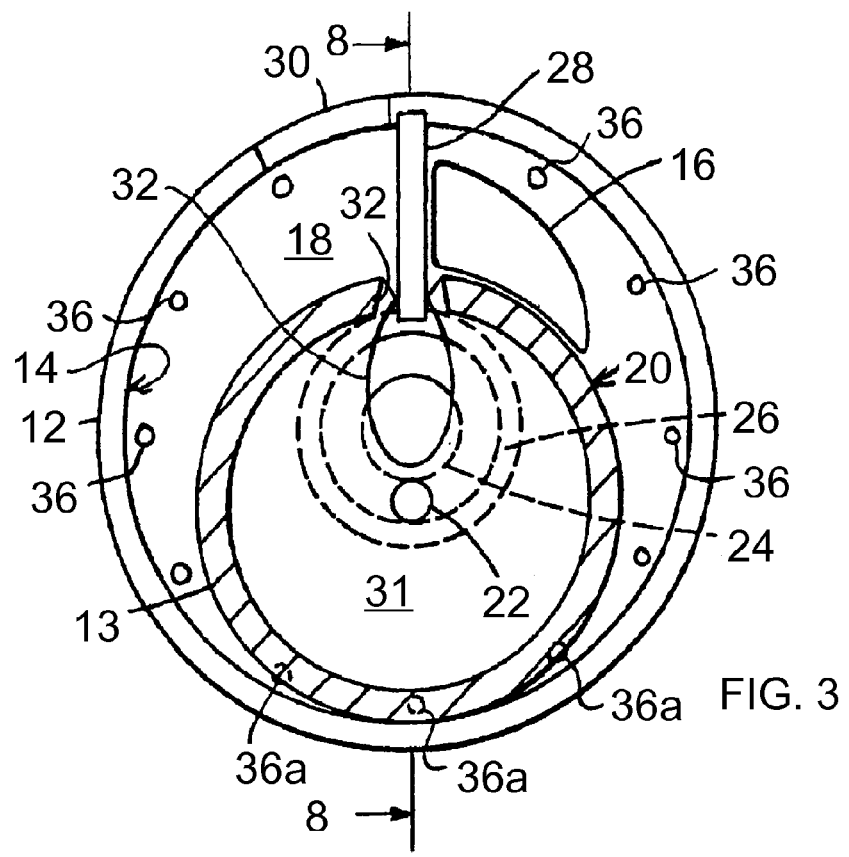
Figure 4:
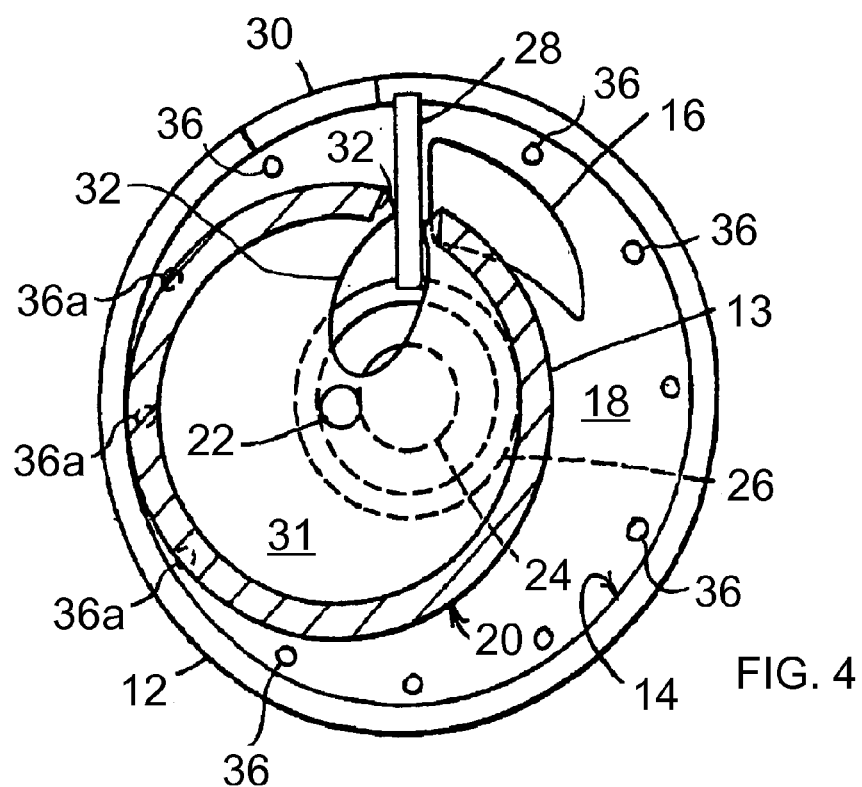

In the movement of the piston 13, a fixed volume of water is swept from the inlet port 16 to the outlet port 30, as will now be described in more detail below. The plate 31 is illustrated in FIG. 1 in a cut-away representation to further illustrate the axial pin 22, boss 24 and collar 26. In FIGS. 2 to 4, the plate is illustrated without holes 33 so as not to obscure the relationship between the pin 22, boss 24 and collar 26.

In the position shown in FIG. 1, in-flowing water causes the piston 13 to start its oscillatory movement, sliding on the dividing shutter 28. Simultaneously, exhaust water in the remaining part of the piston is being expelled through the outlet port 30.

In the position shown in FIG. 2, the piston has moved around a quarter of its path; the inflowing water continues to fill the interior of the piston 13 and commences filling the region between the shutter 28 and the upstream side of the sealing line between the piston 13 and the chamber 12. Water downstream of the sealing line begins to be expelled through the outlet port 30.

FIG. 3 shows the half-way position in which the interior of the piston 13 is cut off from both ports. In the three-quarter position shown in FIG. 4, water is again expelled from the interior of the piston 13 via the slot 32 and the interior of the piston opens to the inlet port 16 for the beginning of another cycle.

The movement of the piston is communicated to the chamber's exterior for counting via the axial pin 22 by known means.

As discussed above in relation to the prior art, water flowing through fluid meters typically contains debris that may impede the rotation of a piston or scour the piston sidewall 20 or chamber sidewall 14 by acting abrasively between respective piston sidewall 20, piston end surface 34, and the chamber sidewall 14 and base 18. As has become apparent to the inventors, debris at the chamber sidewall 14 tends to accumulate and fall to the base 18, increasing friction between the piston end surface 34 and the base 18.

To counter this problem, as illustrated in FIGS. 1 to 4, at least one recess in the form of eleven blind holes 36 are provided on the base 18 to retain the debris carried by the metered water. The width of the holes 36 is provided such that when the piston end surface 34 is adjacent one or more recesses, such as holes 36a illustrated in FIGS. 1 to 4, no water can pass from the piston exterior to the piston interior across the piston end surface 34 via the holes 36a. This is to ensure that while the holes 36 are able to retain debris they do not provide a leak path from the meter inlet 16 to the outlet 30.

In the embodiment, illustrated in FIGS. 1 to 4, the holes 36 are blind and cylindrical in shape. Alternatively, the holes are part spherical in shape. While eleven holes are described, there may be fewer or more holes. In the embodiment illustrated in FIGS. 1 to 4, the holes 36 are positioned on the base 18 adjacent the chamber sidewall 14.

Figure 5:
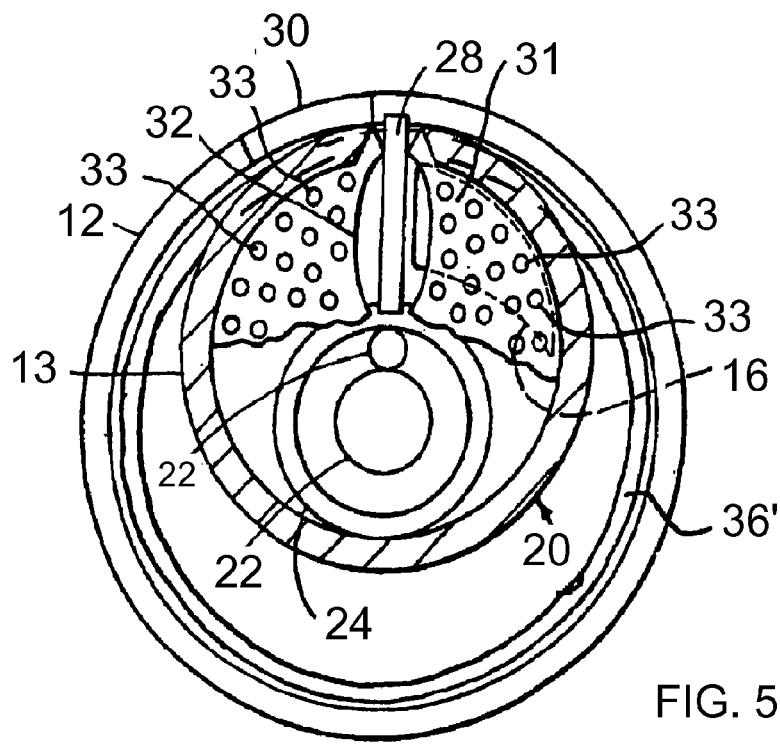
FIGS. 5 and 6 are diagrammatic plans views illustrating alternative embodiments of the chamber.
Figure 6:
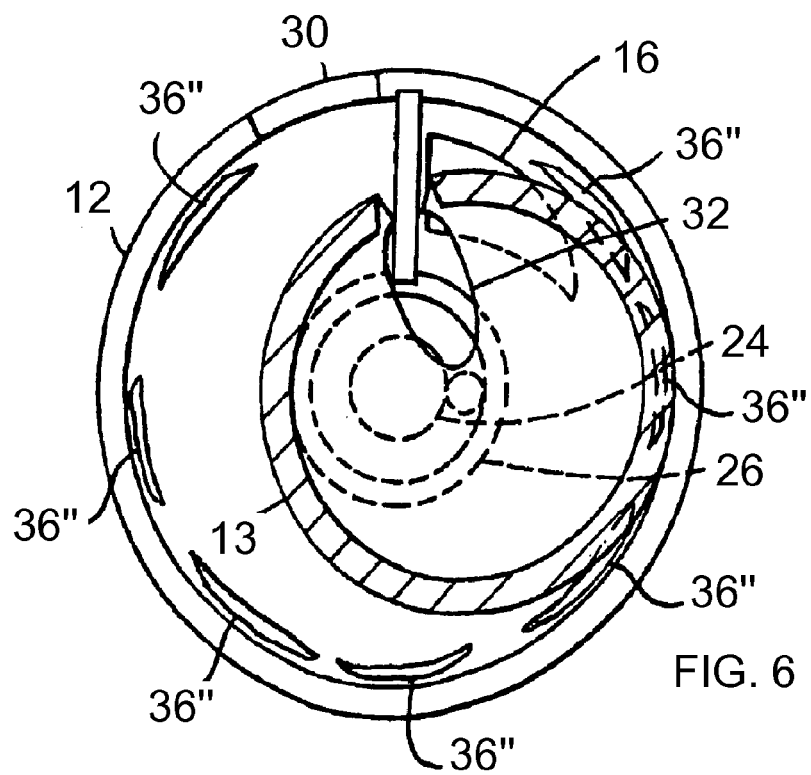
Figure 7:
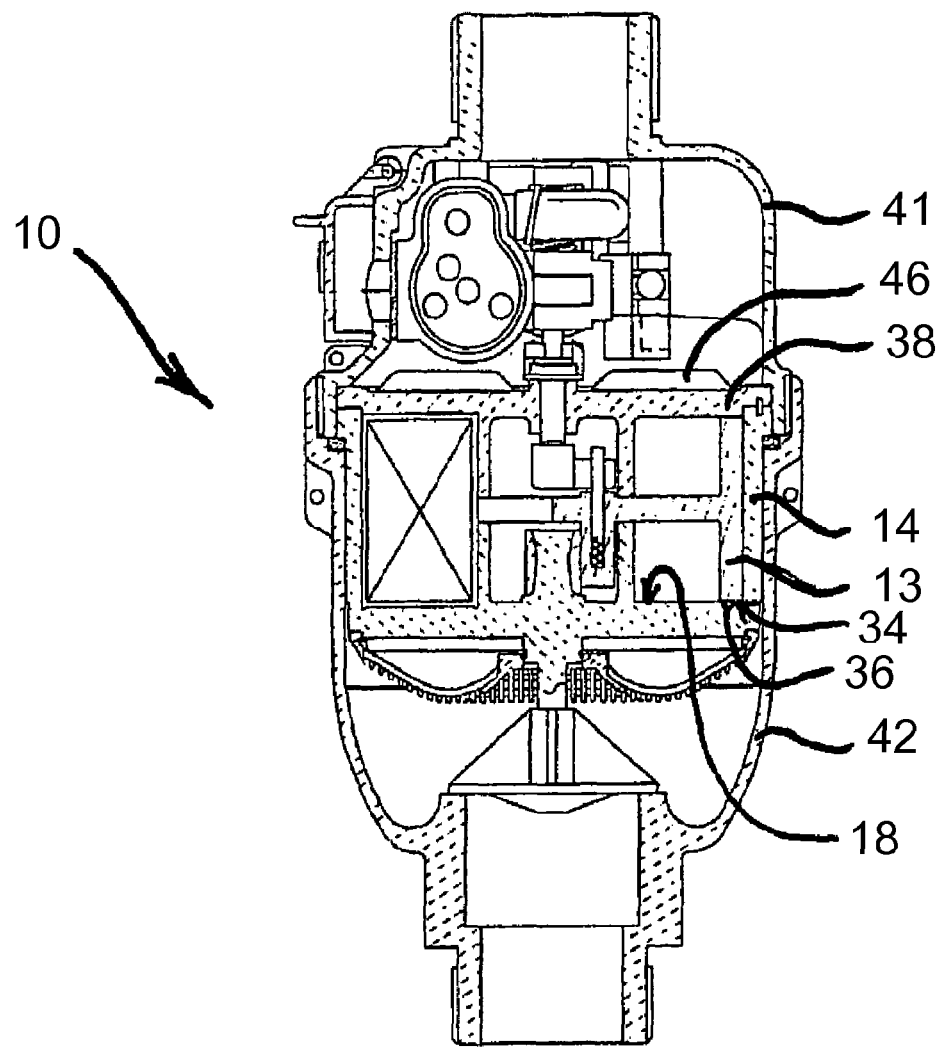
FIG. 7 is a sectioned side elevation of flow meter incorporating embodiments of the present invention.

As will be understood, the recess or recesses need not be circular, as in the above described embodiment, but may be any shape which will not provide a fluid communicative path between the piston interior and exterior under the piston end surface 34. For example, in the embodiment illustrated in FIG. 5, the recess is in the form of an annular groove 36' at the periphery of the base 18. Also, an additional concentric groove (not shown) may be provided in the base about the boss 24. FIG. 6 illustrates another alternative embodiment where the recesses are in the form of crescent shaped grooves 36".

In alternative embodiments, the holes are positioned differently to the embodiment illustrated in FIGS. 1 to 4. For example, the holes may also be located in the piston end surface 34. When holes are in the piston end surface 34 they are also arranged so that no water can pass from the piston exterior to the piston interior across the piston end surface 34 via the holes. Holes may also be provided in an opposite piston end surface adjacent a lid 38 which closes the chamber. The holes 36 may be provided only in the piston end surface 34 and/or in the lid 38, proximate where the opposite piston end surface passes. Furthermore, while the holes 36 are illustrated in FIGS. 1 to 4 as being in the base 18 adjacent the chamber sidewall, they may also be positioned in the base 18 adjacent the collar 26, or in the base 18 between the chamber sidewall 14 and the collar 26.

Figure 8:
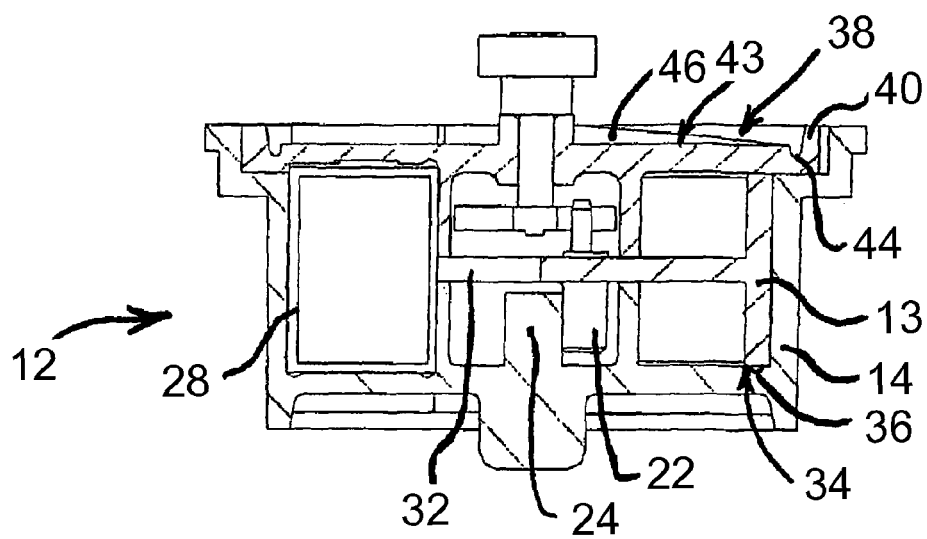
FIG. 8 is a part-sectioned side elevation of the chamber illustrated in FIG. 3, taken on line 8-8, incorporating an alternative lid embodiment of the present invention.

FIG. 8 illustrates a feature addressing another problem of the prior art. In this embodiment, a lid 38 enclosing the chamber 12 is flexible adjacent its periphery 40 to reduce the transmission of bending stresses from the periphery 40 of the lid 38 to the remainder thereof. Such stresses are imparted to the periphery of the lid when the lid 38 is clamped to the chamber 12 between first and second meter housing portions 41, 42, illustrated in FIG. 7. This flexibility of the embodiment prevents relative upward movement of a central portion 43 of the lid 38 with respect to the lid periphery 40 when the lid is clamped to the chamber 12 so that leakage between the lid 38 and the piston 13 is reduced.

Figure 9:
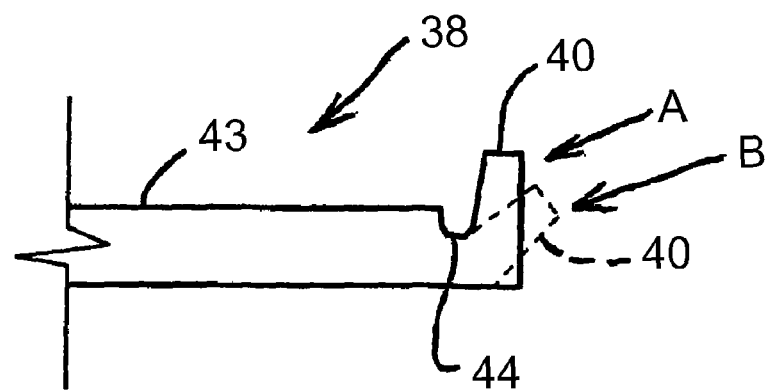
FIG. 9 is a detail view of a portion of the lid of FIG. 8.

The flexibility is achieved by a flex portion adjacent and between the lid's periphery 40 and central portion 43. In this embodiment, the flex portion takes the form of a circular gully 44 which joins the periphery 40 to the central portion 43, and is adapted to operate in a hinge-like manner to permit the flexibility. FIG. 9 illustrates how when the periphery 40 is bent from a non-clamped position A to a clamped position B (exaggerated for the purpose of illustration), the bending stress is not transferred to the central portion 43.

The lid 38 also comprises strengthening ribs 46 on the central portion 43 to further reduce or prevent distortion of the lid 38.

The lid 38 may be used in conjunction with a chamber having a bottom surface with recesses, such as those illustrated in FIGS. 1 to 6, or with a conventional chamber having no such recesses.

While the invention has been described in reference to its preferred embodiments, it is to be understood that the words which have been used are words of description rather than limitation and that changes may be made to the invention without departing from its scope as defined by the appended claims. For instance, the invention is not limited to the metering of water, but may be used to meter other fluids such as, for example, beverages or petrol (gasoline), or it may be used as a gas meter. Furthermore, as will be appreciated by the skilled addressee, while the invention has been described with reference to a single piston fluid flow meter, it may be adapted for use with a dual piston fluid flow meter, or an impeller-type flow meter.

The invention may be generally described as follows. A fluid flow meter comprises a chamber having a fluid inlet and a fluid outlet. A rotor is displaceable within the chamber, rotation of the rotor being related to the volume of fluid passing through the chamber. The chamber has a surface proximate which an end surface of the rotor passes, the chamber surface and/or the rotor end surface having at least one recess to retain at least a portion of debris carried by the metered fluid. The recess is preferably formed so as not to provide fluid communication from the inlet to the outlet across the rotor end surface. A lid closes an end of the chamber which in use is subject to the pressure of fluid within the chamber. The lid is engaged at its periphery to a wall of the chamber, and is preferably flexible adjacent its periphery to reduce the transmission of bending stresses between the periphery of the lid and the remainder thereof.

The invention claimed is:

1. A fluid flow meter comprising:
   a chamber having a fluid inlet and a fluid outlet; and
   a rotor having an end surface and a sidewall, said rotor being displaceable within the chamber, rotation of the rotor being related to
   the volume of fluid passing through the chamber,
   wherein the chamber has a surface proximate which the end surface of the rotor passes, the chamber surface and/or the rotor end surface having at least one recess to retain at least a portion of debris carried by the metered fluid wherein the at least one recess is formed so as not to provide fluid communication from the inlet to the outlet of the chamber across the rotor end surface via the recess, and wherein the at least one recess has a width in one direction which is less than a cross sectional width of a sidewall of the rotor.

2. The fluid flow meter of claim 1 wherein the at least one recess is in a bottom surface of the chamber.

3. The fluid flow meter of claim 1 wherein the at least one recess is rounded.

4. The fluid flow meter of claim 1 wherein the at least one recess is cylindrical.

5. The fluid flow meter of claim 1 wherein the at least one recess is elongate.

6. The fluid flow meter of claim 1 wherein the at least one recess is annular and coaxial with an axis of the chamber.

7. The fluid flow meter of claim 1 wherein the at least one recess is adjacent a sidewall of the chamber.

8. The fluid flow meter of claim 1 comprising a plurality of said recesses.

9. The fluid flow meter of claim 1 wherein the rotor is a rotary piston.

10. The fluid flow meter of claim 1 comprising a lid closing an end of the chamber which in use is subject to the pressure of fluid within the chamber, the lid being engageable at its periphery to a sidewall of the chamber, the lid being flexible adjacent its periphery to reduce the transmission of bending stresses between the periphery of the lid and the remainder thereof.

11. The fluid flow meter of claim 1, wherein the at least one recess is a blind hole.

12. A fluid flow meter comprising:
    a chamber having a fluid inlet and a fluid outlet;
    a rotor displaceable within the chamber, rotation of the rotor being related to
    the volume of fluid passing through the chamber; and
    a lid closing an end of the chamber which in use is subject to the pressure of fluid within the chamber, the lid being engaged at its periphery to a wall of the chamber, the lid being flexible adjacent its periphery to reduce the transmission of bending stresses between the periphery of the lid and the remainder thereof, the lid having an annular flex portion adjacent its periphery permitting said flexibility, and wherein the flex portion includes a clamping portion of said engagement of the lid to the chamber.

13. A fluid flow meter comprising:
    a chamber having a fluid inlet and a fluid outlet;
    a rotor displaceable within the chamber, rotation of the rotor being related to
    the volume of fluid passing through the chamber; and
    a lid closing an end of the chamber which in use is subject to the pressure of fluid within the chamber, the lid being engaged at its periphery to a wall of the chamber, the lid being flexible adjacent its periphery to reduce the transmission of bending stresses between the periphery of the lid and the remainder thereof, the lid having an annular flex portion adjacent its periphery permitting said flexibility, wherein the flex portion comprises a groove permitting said flexibility.

14. The fluid flow meter of claim 13 wherein the groove is annular about a centre of the lid.

* * * * *